United States Patent

[11] 3,549,954

[72] Inventors Leo B. Bourgeault
Wall Township;
Alfred Compoly, Marlboro, N.J.
[21] Appl. No. 616,975
[22] Filed Feb. 17, 1967
[45] Patented Dec. 22, 1970
[73] Assignee The Bendix Corporation
a corporation of Delaware

[54] UNIJUNCTION FREQUENCY DETECTOR
4 Claims, 1 Drawing Fig.

[52] U.S. Cl. .......... 317/147, 317/5
[51] Int. Cl. .......... H01h 47/20; G04r 23/00
[50] Field of Search .......... 317/5, 147, 148.5; 318/309, 326, 327, 328, 461, 463, 464, 465; 322/29, 32, 33; 307/233, 129; 324/78E, 78Q, 68A

[56] References Cited

UNITED STATES PATENTS

| | | | |
|---|---|---|---|
| 3,436,607 | 4/1969 | Yagusic | 317/142 |
| 3,457,464 | 7/1969 | Wallentowitz | 317/142 |
| 3,187,202 | 6/1965 | Case | 307/233 |
| 3,062,988 | 11/1962 | Fitch et al. | 317/5 |
| 3,069,558 | 12/1962 | Burt et al. | 307/233 |
| 3,351,811 | 11/1967 | Buckley et al. | 317/5 |
| 3,403,269 | 9/1968 | Thompson | 307/233X |

*Primary Examiner*—J. D. Miller
*Assistant Examiner*—C. L. Yates
*Attorneys*—Plante, Hartz, Smith and Thompson and James M. Nickels

ABSTRACT: Apparatus for detecting a predetermined frequency in which the time constant of a RC network controls the firing of an unijunction transistor upon the input frequency being below a predetermined level.

PATENTED DEC 22 1970
3,549,954
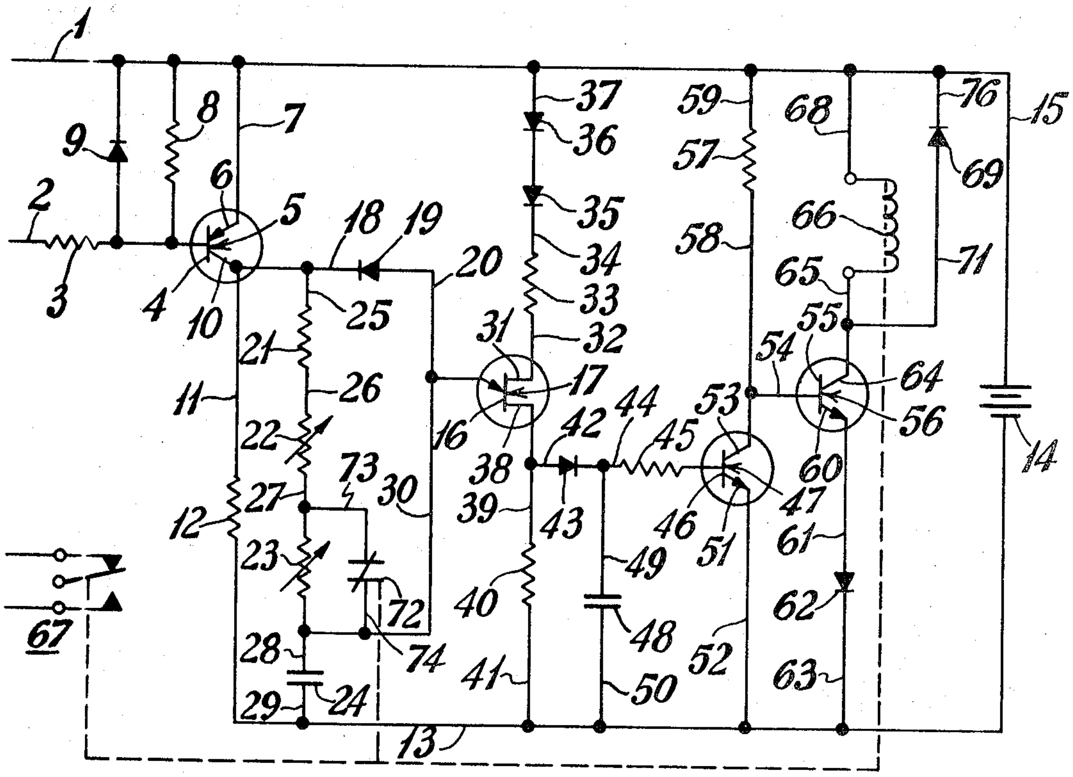
INVENTORS
ALBERT W. COMPOLY
LEO B. BOURGEAULT
BY
[signature]
ATTORNEY

UNIJUNCTION FREQUENCY DETECTOR

BACKGROUND OF THE INVENTION

1. Field of the Invention

The invention relates to frequency detection in which a desired function is performed at a selected frequency.

2. Description of the Prior Art

Heretofore tuned LC circuits have been utilized for frequency detection. Such circuits are bulky, especially for low frequencies, and often shift their resonant point. Further the range of frequencies is limited for each LC circuit. The circuitry of the present invention is simple and is relatively insensitive to the magnitude of the AC signal and also to its waveform. It will operate over a range of frequencies from less than 1 cycle to approximately 100,000 cycles per second. Further, it will operate satisfactorily over a temperature range of −55° C. to 125° C.

SUMMARY

The present invention is directed to the field of frequency detection where a desired function is to be performed upon the frequency reaching a predetermined value. As an example, a switching function such as used in a variable speed constant frequency system as described and claimed in Ser. No. 465,003 filed June 18, 1965 now U.S. Pat. No. 3,378,756, issued Apr. 16, 1968.

BRIEF DESCRIPTION OF THE DRAWING

The single FIG. is a schematic diagram of a circuit embodying the invention.

DESCRIPTION OF THE PREFERRED EMBODIMENT

Referring now to the drawing, input lines 1 and 2 are connected to an AC input signal (not shown). The line 2 is connected through resistor 3 to base 4 of a transistor 5. The transistor 5 has an emitter 6 connected by conductor 7 to the line 1. A resistor 8 and diode 9 are connected between the lines 1 and 2. The resistor 3 is a current-limiting resistor for preventing damage to the transistor 5. The value of the resistor 3 depends upon the level of the input signal. The diode 9 is utilized as a reverse voltage clamp to prevent excess voltage from appearing across the emitter base junction of the transistor 5.

The transistor 5 has a collector 10 connected by conductor 11, resistor 12 and conductor 13 to one side of a source of DC indicated as a battery 14. The other side of the battery 14 is connected by conductor 15 to the conductor 1. Base 16 of an unijunction transistor 17 is connected by conductor 18, diode 19 and conductor 20 to the collector 10 of the transistor 5. Resistors 21, 22, 23 and capacitor 24 are connected by conductors 25, 26, 27, 28, and 29 to the conductors 13 and 18. The base 16 of the transistor 17 is also connected by conductor 30 to the conductor 28.

The transistor 17 has an electrode 31 connected by conductor 32, resistor 33, conductor 34, diodes 35 and 36 and conductor 37 to the conductor 1. The transistor 17 also has another electrode 38 connected by conductor 39, resistor 40 and conductors 41 to the conductor 13. The resistors 21, 22, 33, and 40, diodes 35 and 36, capacitor 24 and the transistor 17 form an unijunction sawtooth oscillator. The resistor 12 and diode 19 provide a low impedance reset circuit for the capacitor 24.

The electrode 38 of the transistor 17 is also connected by conductor 42, diode 43, conductor 44 and resistor 45 to base 46 of a transistor 47. A capacitor 48 is connected between the conductor 44 and 13 by conductors 49 and 50. The transistor 47 has an emitter 51 connected by conductor 52 to the conductor 13 and a collector 53 connected by conductor 54 to base 55 of a transistor 56. A resistor 57 is connected between the conductor 54 and line 1 by conductors 58 and 59. The transistor 56 has an emitter 60 connected by conductor 61, diode 62 and conductor 63 to the conductor 13. Also the transistor 56 has a collector 64 connected by 65 to one side of relay coil 66 of a relay 67. The other side of the coil 66 is connected by conductor 68 to the line 1. A diode 69 is connected across the 66 by conductors 70 and 71.

In order to provide a spread between pickup and dropout frequency a relay contact 72 is connected by conductors 73 and 74 across the resistor 23. The contact 72 is actuated by the relay coil 66.

In operation, with the DC voltage applied and no AC input signal, the oscillator is off and transistor 56 is conducting which energizes the relay coil 66. Upon an AC signal being applied across the input lines 1 and 2, the transistor 5 is biased on during the negative half cycle of each wave. This results in a pulsed DC voltage at the collector 10 of the transistor 5 at the repetition rate of the AC signal frequency. The capacitor 24 will begin to acquire a charge and its voltage will build up. If the AC signal frequency is low enough to permit the capacitor 24 to acquire a voltage sufficient to fire the unijunction transistor 17 during one-half of a cycle, the oscillator will put out a signal. This signal will turn on the transistor 47 which will then turn off the transistor 56 and the relay coil 66 will be deenergized. The charging time of the capacitor 24 is determined by the resistors 21 and 22. During the "off" half of the cycle of the transistor 5, the remaining charge on the capacitor 24 is discharged through the low impedance path of diode 19 and resistor 12. This is necessary to insure starting the charge on the capacitor 24 at zero volts at the beginning of each "on" half cycle.

As the frequency of the AC signal increases, the available time for the capacitor 24 to charge during each half-cycle is decreased. A frequency level will be reached where the time is insufficient for the capacitor 24 to attain sufficient voltage to fire the transistor 17 and the oscillator will cease oscillations. This will cause the transistor 47 to be turned off and the transistor 56 will go on which will energize the relay coil 66 to cause it to activate the relay 67. The trip point can be changed by varying the setting of the resistor 22.

If the pickup and dropout points are to be the same, the resistor 23 and relay contact 72 can be omitted. However, if it is desired to have a lower dropout point than the pickup point, the resistor 23 is inserted in the circuit by the opening of the contact 72. This will increase the time constant of the RC network and reduce the dropout frequency. Upon the input frequency falling below the preset value, the oscillator will again be excited to change the state of the relay 67. The diodes 35 and 36 provide means for compensating for input voltage changes without affecting the frequency set point.

Although only one embodiment of the invention has been illustrated and described, various changes in the form and relative arrangement of the parts which will now appear to those skilled in the art, may be made without departing from the scope of the invention.

We claim:

1. A circuit for detecting a predetermined frequency of a variable frequency signal, comprising means responsive to the signal for providing a pulsating DC voltage corresponding to the frequency of the signal, an RC network connected to said means and having a capacitor charged by the pulsating DC voltage during alternate half cycles, means connected to the capacitor for discharging the capacitor during other alternate half cycles of the pulsating DC voltage, a unijunction transistor connected to the capacitor, the RC network having a time constant of a value so that the pulsating DC signal charges the capacitor sufficiently during the alternate half cycles to cause the unijunction transistor to conduct when the frequency of the signal is below the predetermined frequency and to charge the capacitor insufficiently so that the unijunction transistor does not conduct when the frequency of the signal is above the predetermined frequency, and means connected to the unijunction transistor including switching means biased to one state when the unijunction transistor conducts and to another state when the unijunction transistor is nonconducting.

2. A circuit as described in claim 1 in which the RC network includes a resistor, and means responsive to operation of the switching means to change the resistance of the resistor to change the time constant of the RC network in one state of the switching means.

3. A circuit as described in claim 1 in which the switching means is a relay.

4. A circuit as described in claim 1 in which the RC network includes a variable resistor for changing the time constant of the RC network for varying the predetermined frequency detected.

UNITED STATES PATENT OFFICE
CERTIFICATE OF CORRECTION

Patent No. 3,549,954 Dated December 22, 1970

Inventor(s) Leo B. Bourgeault et al.

It is certified that error appears in the above-identified patent and that said Letters Patent are hereby corrected as shown below:

On the cover sheet [72] "Alfred Compoly" should read -- Albert W. Compoly --.

Signed and sealed this 13th day of July 1971.

(SEAL)
Attest:

EDWARD M.FLETCHER,JR.
Attesting Officer

WILLIAM E. SCHUYLER, JR.
Commissioner of Patents